United States Patent
Kobayashi et al.

(10) Patent No.: US 11,729,550 B2
(45) Date of Patent: Aug. 15, 2023

(54) ECHO CANCELATION METHOD, APPARATUS, PROGRAM AND RECORDING MEDIUM

(71) Applicant: NIPPON TELEGRAPH AND TELEPHONE CORPORATION, Tokyo (JP)

(72) Inventors: Kazunori Kobayashi, Tokyo (JP); Shoichiro Saito, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/611,895

(22) PCT Filed: May 21, 2019

(86) PCT No.: PCT/JP2019/020081
§ 371 (c)(1),
(2) Date: Nov. 16, 2021

(87) PCT Pub. No.: WO2020/234991
PCT Pub. Date: Nov. 26, 2020

(65) Prior Publication Data
US 2022/0240009 A1 Jul. 28, 2022

(51) Int. Cl.
*H04R 3/02* (2006.01)
*H04R 1/02* (2006.01)

(52) U.S. Cl.
CPC ............... *H04R 3/02* (2013.01); *H04R 1/02* (2013.01)

(58) Field of Classification Search
CPC . H04R 3/02; H04R 3/12; H04R 3/005; H04R 1/02; H04R 2499/13; H04M 9/082
See application file for complete search history.

(56) References Cited

U.S. PATENT DOCUMENTS 9,881,632 B1*   1/2018  Every ................... H04R 3/005
2010/0189275 A1*  7/2010  Christoph ............. H04R 3/005
                                                       381/86
(Continued)

FOREIGN PATENT DOCUMENTS

JP   2019-001313 A   1/2019
WO  2017-064839 A1   4/2017

OTHER PUBLICATIONS

NTT Holding Company Press Release, "Has Developed Sound Collection Technique for Making Voice Operations and Communications in Automobile Comfortable", [online], [searched on Apr. 26, 2019], Internet <URL: http://www.ntt.co.jp/news2018/1802/180219c. html> with its translation by computer.

*Primary Examiner* — Jason R Kurr

(57) ABSTRACT

In-car communication and hands-free talking with good sound quality are realized. An echo cancelation apparatus (4) is for use in a vehicle in which microphones (M1, M2) and loudspeakers (S1, S2) are disposed in acoustic regions (100, 200). A loudspeaker (S1) and a microphone (M1) are disposed in a first acoustic region (100), and a loudspeaker (S2) and a microphone (M2) are disposed in a second acoustic region (200). An acoustic signal picked up by the microphone (M1) disposed in the first acoustic region (100) is emitted from the loudspeaker (S2) disposed in the second acoustic region (200). An acoustic signal picked up by the microphone (M2) disposed in the second acoustic region (200) is emitted from the loudspeaker (S1) disposed in the first acoustic region (100). The microphone (M1) is designed to hardly collect a sound emitted from the loudspeaker (S2).

3 Claims, 9 Drawing Sheets

(56) References Cited

U.S. PATENT DOCUMENTS

2017/0011753 A1\* 1/2017 Herbig ................ G10L 21/0232
2018/0115650 A1 4/2018 Suzuki et al.

\* cited by examiner

ECHO CANCELATION METHOD, APPARATUS, PROGRAM AND RECORDING MEDIUM

CROSS-REFERENCE TO RELATED APPLICATIONS

This application is a U.S. National Stage Application filed under 35 U.S.C. § 371 claiming priority to International Patent Application No. PCT/JP2019/020081, filed on 21 May 2019, the disclosure of which is hereby incorporated herein by reference in its entirety.

TECHNICAL FIELD

The present invention relates to a technique for processing acoustic signals, and more particularly to a technique for supporting conversations in a vehicle such as an automobile.

BACKGROUND ART

In-car communication (ICC) is used by which loudspeakers and microphones are installed in an automobile, and the sound is amplified from a front row seat to a rear row seat, or from a rear row seat to a front row seat, thereby facilitating conversations under noise such as during traveling (see NPL 1). Also, hands-free talking is used by which an occupant inside an automobile and a person outside the automobile talk to each other using a loudspeaker and a microphone installed in the automobile (see NPL 1). Here, let us consider a system that allows for hands-free talking in all seats using a plurality of microphones and a plurality of loudspeakers installed in an automobile. Using this system enables talking from many persons to one person, or from many persons to many persons, thus making it possible for all occupants to converse with each other, for example, when a large number of people travel together by separately riding a plurality of automobiles. In this case, even a voice of an occupant inside the same automobile can be difficult to hear due to the traveling sound, and it is therefore desirable to use hands-free talking and in-car communication in combination.

FIG. 1 shows an example of in-car communication functionality by which conversations are readily conducted between an occupant in a front row seat and an occupant in a rear row seat in a traveling automobile, using a plurality of microphones and a plurality of loudspeakers installed in the automobile. In the example shown in FIG. 1, front row seats including a driver's seat 91 and a passenger seat 92, and rear row seats including rear seats 93 and 94 are installed inside an automobile 90, with a microphone M1 and a loudspeaker S1 disposed in the vicinity of the front row seats, and a microphone M2 and a loudspeaker S2 disposed in the vicinity of the rear row seats. An audio signal picked up by the microphone M1 is set to be emitted from the loudspeaker S2, and an audio signal picked up by the microphone M2 is set to be emitted from the loudspeaker S1. Accordingly, the occupants in the front row seats 91 and 92 and the occupants in the rear row seats 93 and 94 can converse with each other.

FIG. 2 shows an example of hands-free talking functionality by which an occupant inside an automobile talks hands-free with a person outside the automobile. In this example, an audio signal that is input from the outside of an automobile 90 is emitted from a loudspeaker S1 located in the vicinity of front row seats and a loudspeaker S2 located in the vicinity of rear row seats, and sound of the occupants inside the automobile 90 is picked up by a microphone M1 located in the vicinity of the front row seats or a microphone M2 located in the vicinity of the rear row seats, and is transmitted to the outside of the automobile 90. Accordingly, the occupants inside the automobile 90 and a person outside the automobile 90 can converse with each other.

To realize functionality, such as the in-car communication functionality and the hands-free talking functionality, by which conversations are conducted using microphones and loudspeakers, it is necessary to cancel sound diffraction (hereinafter also referred to as "acoustic echo") from the loudspeakers to the microphones. As shown in FIG. 3, the diffraction from loudspeakers to microphones occurs in all combinations of the loudspeakers and the microphones. The example shown in FIG. 3 indicates that, when two loudspeakers S1 and S2 and two microphones M1 and M2 are provided, the diffraction from the loudspeaker S1 to each of the microphone M1 and the microphone M2 occurs, and the diffraction from the loudspeaker S2 to each of the microphone M1 and the microphone M2 occurs. Note that in FIG. 3, $H_{xx}(\omega)$ represents the transfer function in a path, indicated by the arrows, from a loudspeaker to a microphone.

As shown in FIG. 4, the conventional in-car communication supports conversations using two adaptive filters (ADFs). An adaptive filter 11 cancels the diffraction to a path from a loudspeaker S1 located in the vicinity of front row seats to a microphone M1 located in the front row seats. An adaptive filter 12 cancels the diffraction to a path from a loudspeaker S2 located in the vicinity of rear row seats to a microphone M2 located in the rear row seats. As shown in FIG. 5, the conventional hands-free talking cancels an acoustic echo contained in a transmission signal to a call counterpart using an adaptive filter 13 disposed between a reception signal and the transmission signal. The conventional techniques use such configurations to realize the in-car communication functionality and the hands-free talking functionality.

CITATION LIST

Non Patent Literature

[NPL 1] NTT Holding Company Press Release, "Has Developed Sound Collection Technique for Making Voice Operations and Communications in Automobile Comfortable", [online], [searched on Apr. 26, 2019], Internet <URL: http://www.ntt.co.jp/news2018/1802/180219c.html>

SUMMARY OF THE INVENTION

Technical Problem

However, in the case of simultaneously using both in-car communication and hands-free talking, simply combining them leads to the problem of insufficient acoustic echo cancellation. During hands-free talking, signal cancellation for conversations between front and rear seats is not performed due to in-car communication, and therefore the sound of in-car communication is added to the sound of hands-free talking, resulting in overlapping or echoing of sounds. For example, when an occupant in a rear row seat speaks, a sound that has been reproduced by a loudspeaker located in the vicinity of the front row seats by in-car communication and has been picked up by a microphone located in the vicinity of the front row seats is mixed and reproduced together, in addition to a sound picked up by a microphone located in the vicinity of the rear row seats.

Additionally, a reception signal of hands-free talking is reproduced from each of the loudspeaker located in the vicinity of the front row seats and the loudspeaker located in the vicinity of the rear row seats, and the reproduced sounds are further reproduced by each of the loudspeaker located in the vicinity of the front row seats and the loudspeaker located in the vicinity of the rear row seats in a path of in-car communication, resulting in overlapping of sounds.

In view of the above-described technical problems, an object of the present invention is to effectively cancel an acoustic echo generated in all acoustic paths using adaptive filters in the case of simultaneously using both in-car communication and hands-free talking, thus realizing in-car communication and hands-free talking with good sound quality.

Means for Solving the Problem

In order to solve the above-described problems, an echo cancelation apparatus according to an aspect of the present invention is an echo cancelation apparatus for use in a vehicle in which a plurality of microphones and a plurality of loudspeakers are disposed in a plurality of predefined acoustic regions, the echo cancelation apparatus including: at least one loudspeaker and at least one microphone disposed in each of the acoustic regions, wherein an acoustic signal picked up by a first microphone disposed in a first acoustic region is emitted from a second loudspeaker disposed in a second acoustic region, an acoustic signal picked up by a second microphone disposed in the second acoustic region is emitted from a first loudspeaker disposed in the first acoustic region, and the first microphone is designed to hardly collect a sound emitted from the second loudspeaker.

Effects of the Invention

According to the present invention, it is possible to realize in-car communication and hands-free talking with good sound quality.

DESCRIPTION OF EMBODIMENTS

Figure 1:
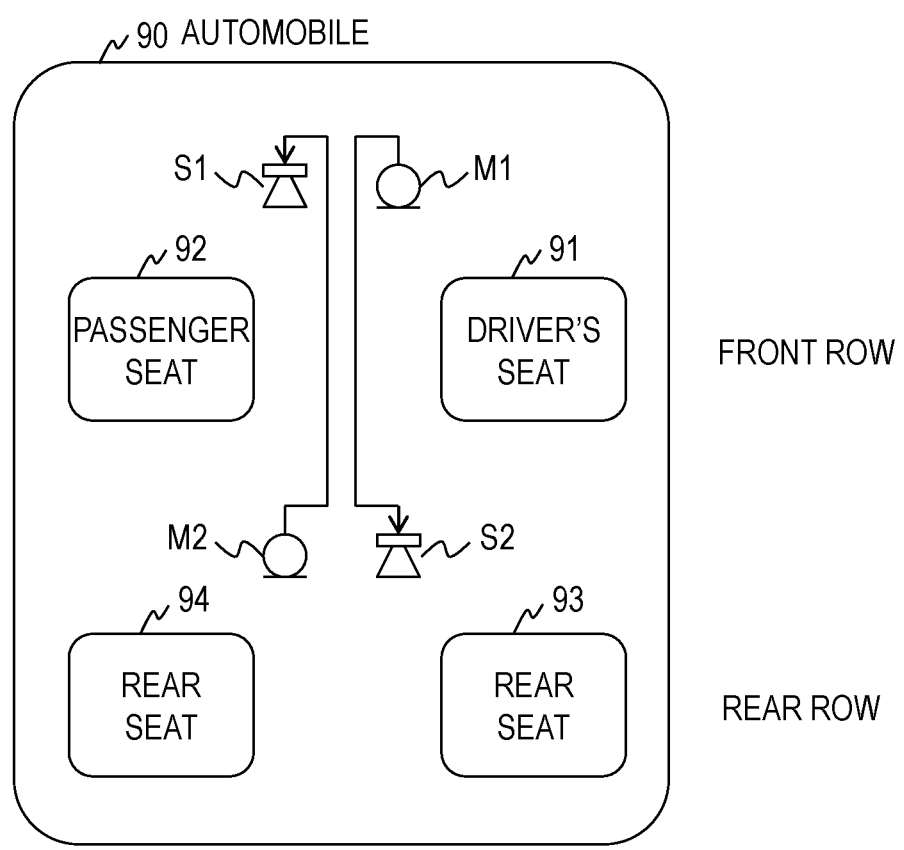
FIG. 1 is a diagram for illustrating in-car communication functionality.
Figure 2:
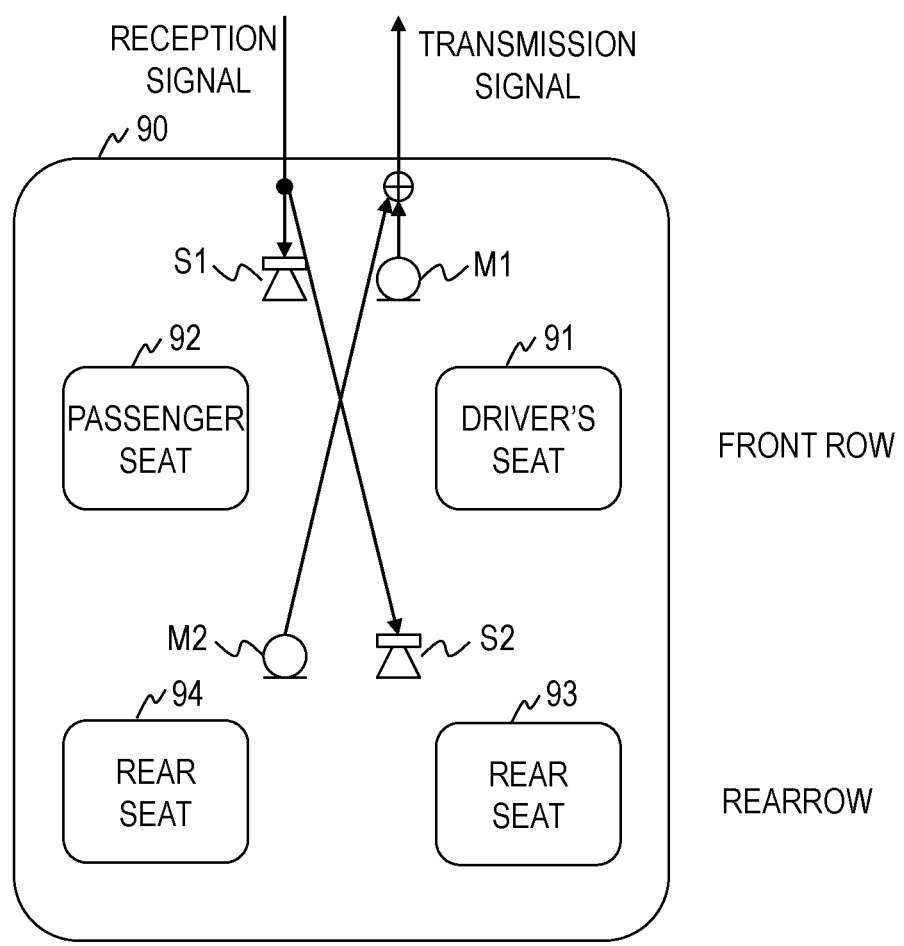
FIG. 2 is a diagram for illustrating hands-free talking functionality.
Figure 3:
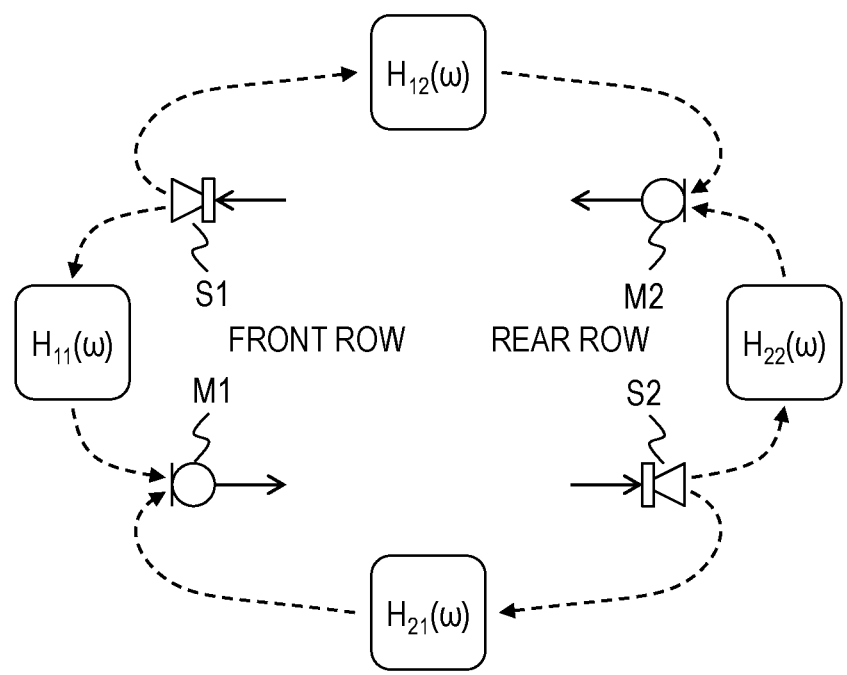
FIG. 3 is a diagram for illustrating paths along which an acoustic echo occurs.
Figure 4:
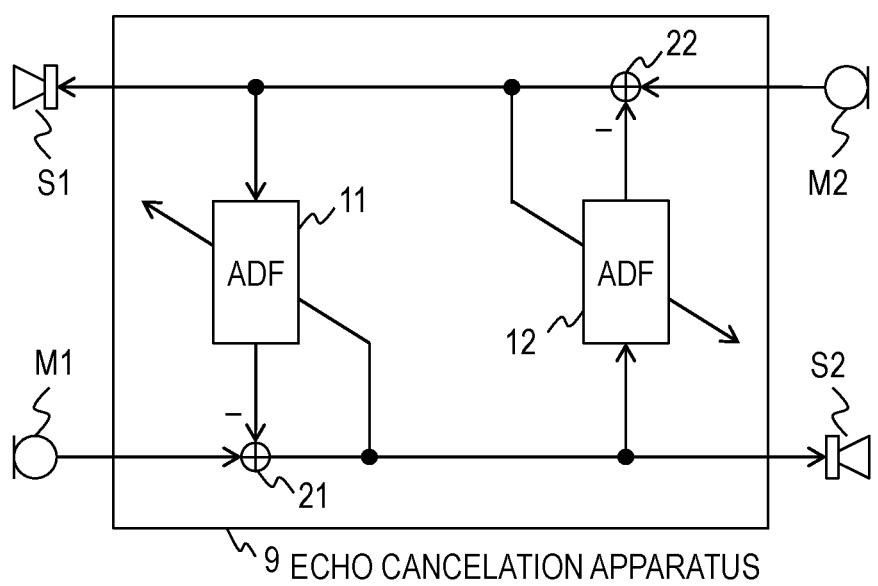
FIG. 4 is a diagram showing an example of the functional configuration of an echo cancelation apparatus that realizes the conventional in-car communication functionality.
Figure 5:
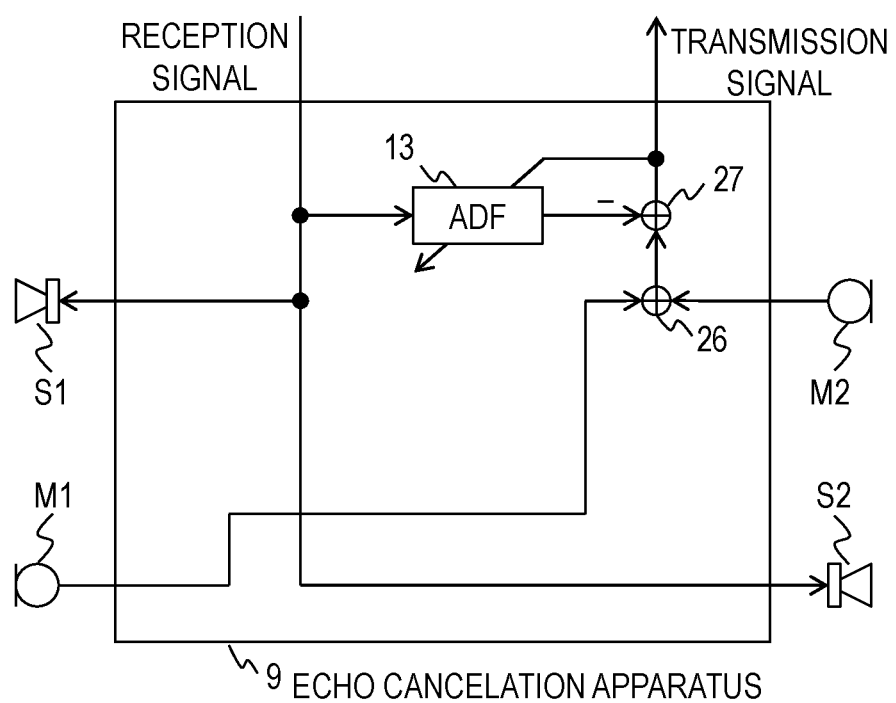
FIG. 5 is a diagram showing an example of the functional configuration of an echo cancelation apparatus that realizes the conventional hands-free talking functionality.

Hereinafter, embodiments of the present invention will be described in detail. Note that in the drawings, constituent parts having the same function are denoted by the same reference numerals, and redundant descriptions thereof are omitted.

First Embodiment

Figure 6:
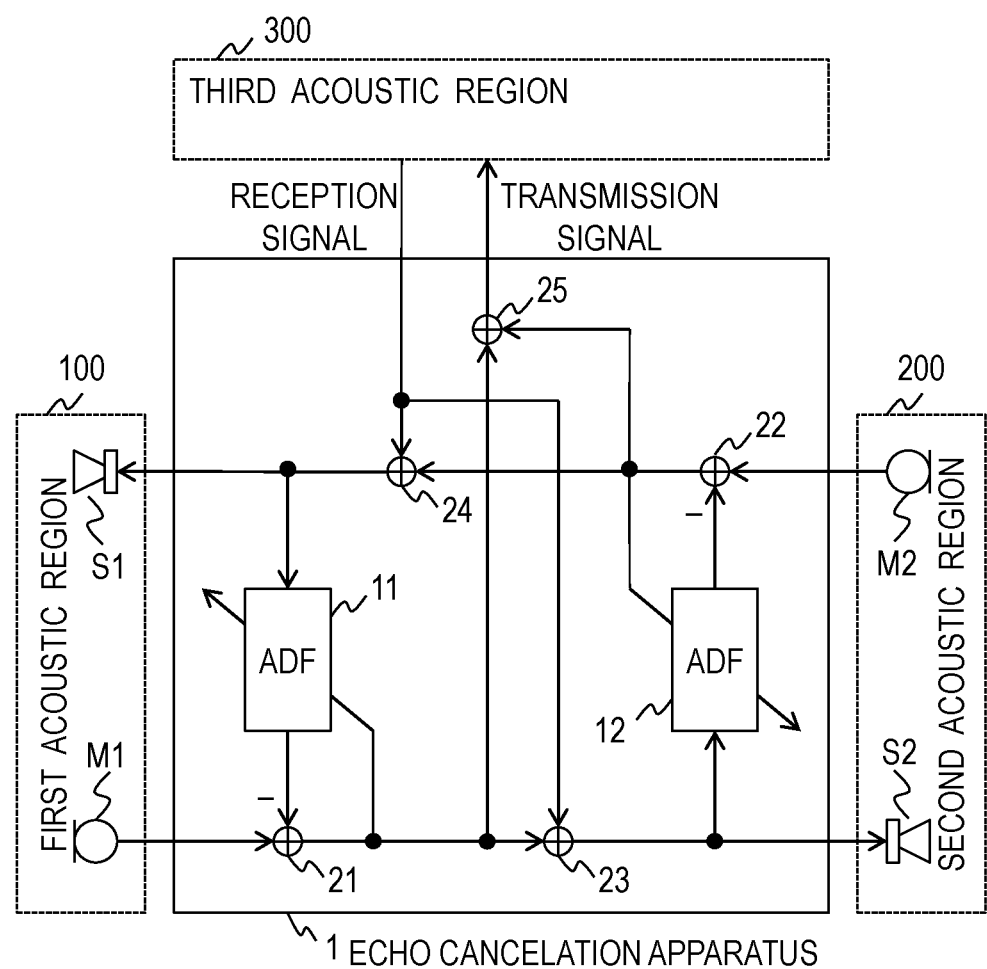
FIG. 6 is a diagram showing an example of the functional configuration of an echo cancelation apparatus according to a first embodiment.

An echo cancelation apparatus according to a first embodiment is a signal processing apparatus that cancels an acoustic echo from an acoustic signal that is to be transmitted, in a system that is installed in a vehicle such as an automobile and that simultaneously realizes both in-car communication functionality and hands-free talking functionality. In the present embodiment, it is assumed that conversations are conducted between two acoustic regions that are predefined in a vehicle and in which at least one microphone and at least one loudspeaker are installed, and at least one acoustic region outside the vehicle. As shown in FIG. 6, the echo cancelation apparatus 1 according to the first embodiment receives, as inputs, an acoustic signal picked up by a microphone M1 installed in a first acoustic region 100, an acoustic signal picked up by a microphone M2 installed in a second acoustic region 200, and an acoustic signal received from a third acoustic region 300. Also, the echo cancelation apparatus 1 outputs, from a loudspeaker S1 installed in the first acoustic region 100 and a loudspeaker S2 installed in the second acoustic region 200, an acoustic signal resulting from performing signal processing on the acoustic signals, and transmits the acoustic signal to the third acoustic region 300. It is possible to simultaneously realize in-car communication functionality and hands-free talking functionality, for example, by implementing the echo cancelation apparatus 1 as an apparatus in which the first acoustic region 100 is a space located in the vicinity of front row seats of an automobile, the second acoustic region 200 is a space located in the vicinity of rear row seats of the automobile, and the third acoustic region 300 is a space (e.g., another automobile) outside the automobile. An echo cancelation method according to the first embodiment is realized by the echo cancelation apparatus 1 performing various types of processing, which will be described later.

The echo cancelation apparatus 1 is, for example, a special device configured by reading a special program into a known or dedicated computer including a central processing unit (CPU), a main storage device (random access memory: RAM) and the like. The echo cancelation apparatus 1 executes each processing under control of the central processing unit, for example. The data input to the echo cancelation apparatus 1 and the data obtained by each processing are stored, for example, in the main storage device, and the data stored in the main storage device is read to the central processing unit as necessary, and used for another processing. At least part of the echo cancelation apparatus 1 may be constituted by hardware such as an integrated circuit.

The echo cancelation apparatus 1 includes an adaptive filter 11, an adaptive filter 12, a subtractor 21, a subtractor 22, an adder 23, an adder 24, and an adder 25. The adaptive filter 11 is a filter for the microphone M1 installed in the first acoustic region. The adaptive filter 12 is a filter for the microphone M2 installed in the second acoustic region. The subtractor 21 subtracts the output of the adaptive filter 11 from an acoustic signal picked up by the microphone M1. The subtractor 22 subtracts the output of the adaptive filter 12 from an acoustic signal picked up by the microphone M2. The adder 23 adds an acoustic signal received from the third acoustic region 300 and the output of the subtractor 21, and outputs the result to the loudspeaker S2. The adder 24 adds an acoustic signal received from the third acoustic region 300 and the output of the subtractor 22, and outputs the result to the loudspeaker S1. The adder 25 adds the output of the subtractor 21 and the output of the subtractor 22, and transmits the result to the third acoustic region 300. In order to cancel an acoustic echo, which is a signal that has been output from a loudspeaker and has been picked up by a microphone, each adaptive filter receives a signal prior to its output from the loudspeaker, as a reference signal as an input, and filters the reference signal to generate a spurious echo. The acoustic echo is cancelled by updating the filter coefficient so as to reduce the power of an error signal resulting from subtracting this spurious echo from the signal picked up by the microphone. The reference signal of the adaptive filter 11 is a signal resulting from adding an acoustic signal picked up by a microphone (not shown) installed in the third acoustic region 300 (i.e., a reception signal of hands-free talking), and an acoustic signal picked up by the microphone M2 (i.e., a signal that is to be reproduced from the front row seats by in-car communication). With this configuration, the adaptive filter 11 can cancel the acoustic echo from both the reception signal of hands-free talking and the reproduction signal of in-car communication. The reference signal of the adaptive filter 12 is a signal resulting from adding an acoustic signal picked up by the microphone (not shown) installed in the third acoustic region 300 (i.e., a reception signal of hands-free talking), and an acoustic signal picked up by the microphone M1 (i.e., a signal that is to be reproduced from the rear row seats by in-car communication). With this configuration, the adaptive filter 12 can cancel the acoustic echo from both the reception signal of hands-free talking and the reproduction signal of in-car communication. The signal that is output from a loudspeaker (not shown) installed in the third acoustic region 300 (i.e., a transmission signal of hands-free talking) is a signal resulting from adding the outputs of the two adaptive filters 11 and 12. Accordingly, both the speech of the occupants in the front row seats and the speech of the occupants in the rear row seats can be processed as call signals of hands-free talking.

For the adaptive filters 11 and 12, it is possible to use, for example, an algorithm such as a least mean square (LMS) algorithm and a normalized LMS (NL MS) algorithm. Although FIG. 6 shows only one loudspeaker disposed in each of the acoustic regions, a plurality of loudspeakers may be disposed in each of the acoustic regions. Additionally, equalizer processing may be provided in each of the loudspeakers.

Second Embodiment

In the first embodiment, the echo cancellation of call signals of hands-free talking and the echo cancellation of reproduction signals of in-car communication are performed by the same adaptive filter. The acoustic path from a loudspeaker and a microphone that are disposed in the same acoustic region (e.g., from the loudspeaker S1 to the microphone M1 for the front row seats, or from the loudspeaker S2 to the microphone M2 for the rear row seats) is the same for call signals of hands-free talking and reproduction signals of in-car communication, and it is therefore possible to perform the echo cancellation by one adaptive filter. However, for call signals of hands-free talking, a path from the loudspeaker S1 for the front row seats to the microphone M2 for the rear row seats, and a path from the loudspeaker S2 for the rear row seats to the microphone M1 for the front row seats are additionally present. Accordingly, the use of the first embodiment results in a degradation in the cancellation performance. In the second embodiment, this degradation in the cancellation performance is prevented by adding adaptive filters to the first embodiment.

Figure 7:
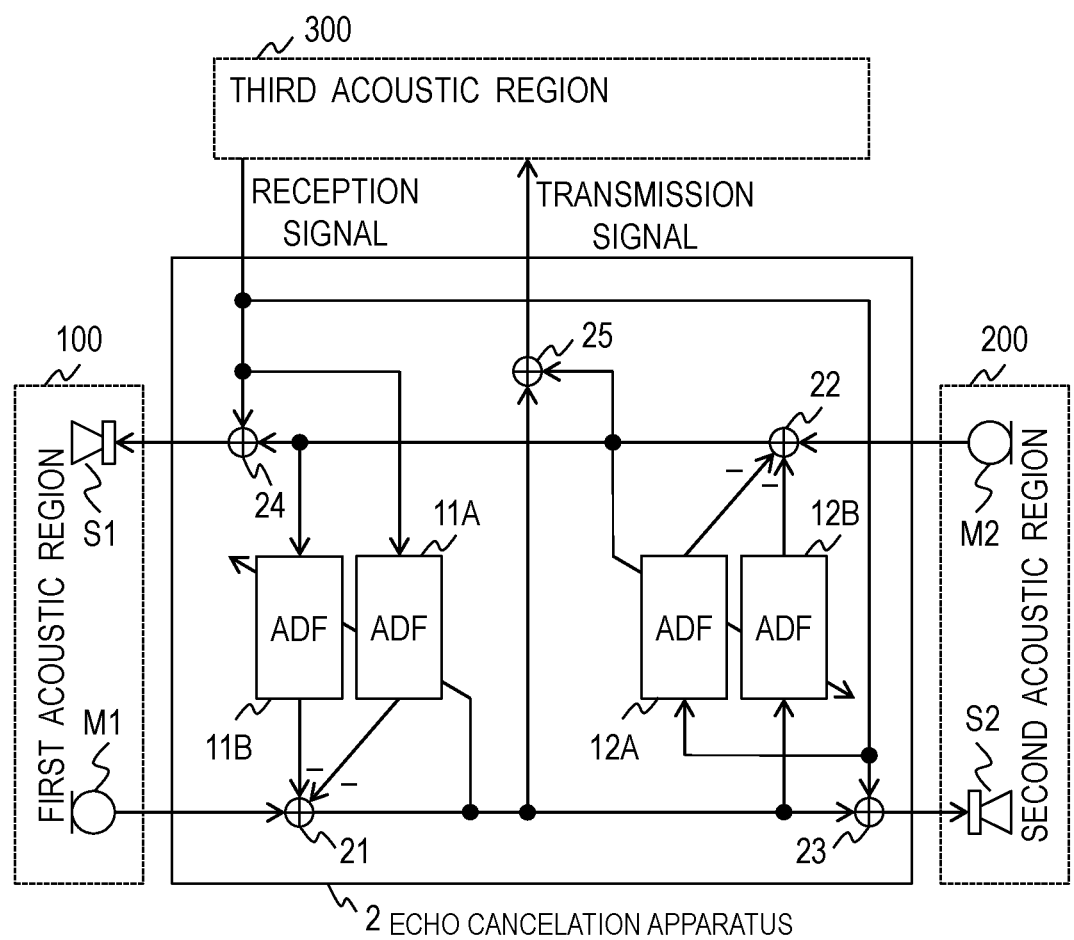
FIG. 7 is a diagram showing an example of the functional configuration of an echo cancelation apparatus according to a second embodiment.

As shown in FIG. 7, an echo cancelation apparatus 2 according to the second embodiment separately provides adaptive filters for hands-free talking and adaptive filters for in-car communication, and includes a total of four adaptive filters. Also, as in the case of the echo cancelation apparatus 1 according to the first embodiment, the echo cancelation apparatus 2 includes subtractors 21 and 22 and adders 23 to 25. However, the subtractor 21 subtracts the output of an adaptive filter 11A and the output of an adaptive filter 11B from an acoustic signal picked up by the microphone M1, and the subtractor 22 subtracts the output of an adaptive filter 12A and the output of an adaptive filter 12B from an acoustic signal picked up by the microphone M2. The adaptive filter 11A for hands-free talking estimates a path from the loudspeaker S1 in the first acoustic region 100 to the microphone M1 in the first acoustic region 100, and a path from the loudspeaker S2 in the second acoustic region 200 to the microphone M1 in the first acoustic region 100, using a call signal of hands-free talking, which is a reception signal from the third acoustic region 300, as a reference signal, and cancels the call signal component of hands-free talking of an acoustic echo picked up by the microphone M1. The adaptive filter 12A for hands-free talking estimates a path from the loudspeaker S2 in the second acoustic region 200 to the microphone M2 in the second acoustic region 200, and a path from the loudspeaker S1 in the first acoustic region 100 to the microphone M2 in the second acoustic region 200, using a call signal of hands-free talking, which is a reception signal from the third acoustic region 300, as a reference signal, and cancels the call signal component of hands-free talking of an acoustic echo picked up by the microphone M2. The adaptive filter 11B for in-car communication estimates a path from the loudspeaker S1 in the first acoustic region 100 to the microphone M1 in the first acoustic region 100, using, as a reference signal, a reproduction signal of in-car communication that is output from the loudspeaker S1 in the first acoustic region 100, or in other words, a reproduction signal of in-car communication out of input signals of the adder 24 that is located in the preceding stage of the loudspeaker S1 and that mixes a call signal of hands-free talking and a reproduction signal of in-car communication, and cancels the reproduction signal component of in-car communication of an acoustic echo picked up by the microphone M1. The adaptive filter 12B for in-car communication estimates a path from the loudspeaker S2 in the second acoustic region 200 to the microphone M2 in the second acoustic region 200, using, as a reference signal, a reproduction signal of in-car communication that is output from the loudspeaker S2 in the second acoustic region 200, or in other words, a reproduction signal of in-car communication out of input signals of the adder 23 that is located in the preceding stage of the loudspeaker S2 and that mixes a call signal of hands-free talking and a reproduction signal of in-car communication, and cancels the reproduction signal component of in-car communication of an acoustic echo picked up by the microphone M2.

The echo cancelation apparatus 2 according to the second embodiment requires a larger amount of computation due to the additional adaptive filters, but can achieve higher cancellation performance than that achieved by the first embodiment.

Third Embodiment

Figure 8:
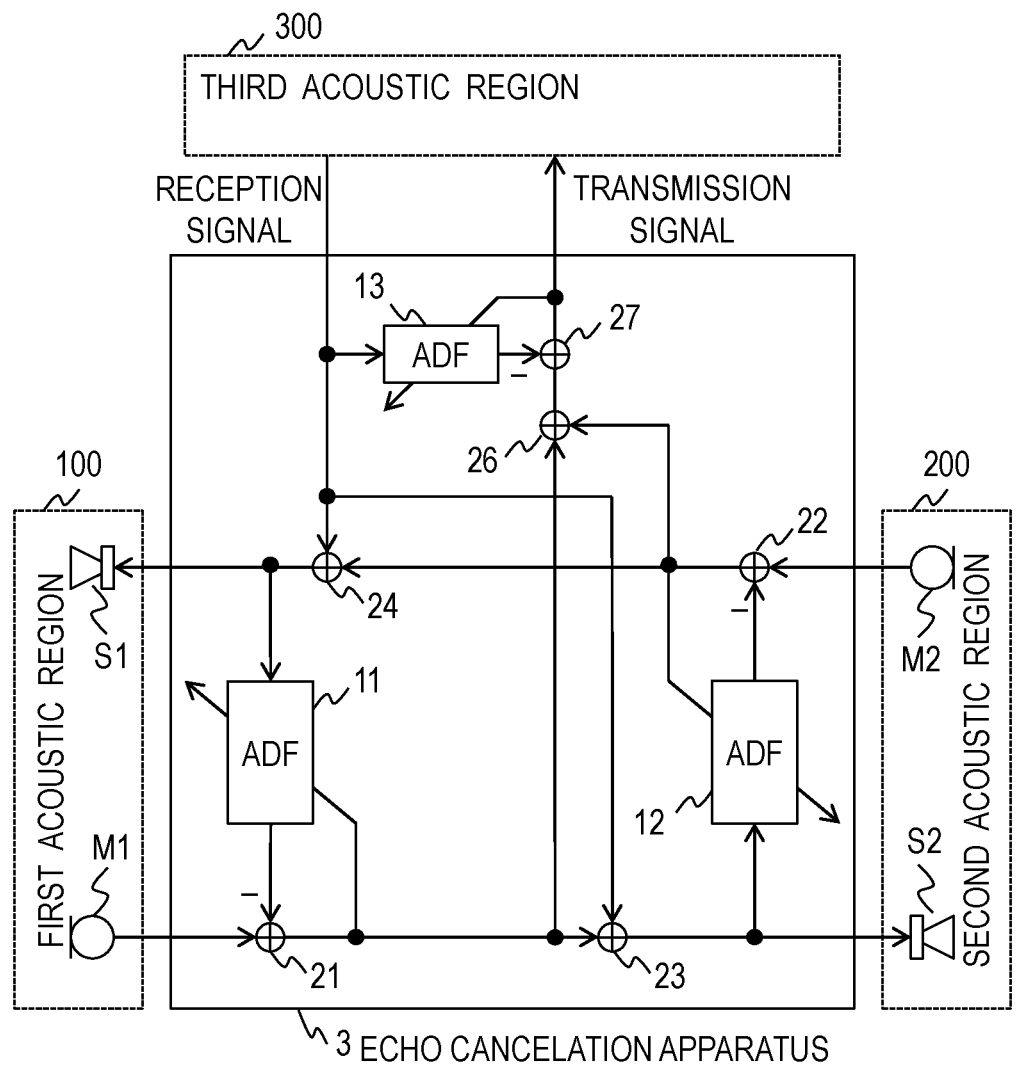
FIG. 8 is a diagram showing an example of the functional configuration of an echo cancelation apparatus according to a third embodiment.

The third embodiment is an intermediate method between the first embodiment and the second embodiment. As shown in FIG. 8, an echo cancelation apparatus 3 according to the third embodiment includes an adaptive filter 13 for call signals of hands-free talking, in addition to the two adaptive filters 11 and 12 included in the echo cancelation apparatus 1 according to the first embodiment, and uses a total of three adaptive filters. Also, as in the case of the echo cancelation apparatus 1 according to the first embodiment, the echo cancelation apparatus 3 includes subtractors 21 and 22 and adders 23 and 24, and further includes an adder 26 that adds the output of the subtractor 21 and the output of the subtractor 22, and a subtractor 27 that subtracts the output of the adaptive filter 13 from the output of the adder 26, and transmits the result to the third acoustic region 300. The reference signal of the adaptive filter 13 is a call signal of hands-free talking, which is a reception signal from the third acoustic region 300. With this configuration, the adaptive filter 13 can cancel an acoustic echo from a transmission signal of the hands-free talking. By adding the adaptive filter 13 to the call path portion of the first embodiment, it is possible to further suppress any remaining speech sound that has not been eliminated by the adaptive filters 11 and 12 of the first embodiment, thus achieving high cancellation performance. The third embodiment is advantageous in that it requires a less amount of computation than the second embodiment because three adaptive filters are needed.

Fourth Embodiment

Figure 9:
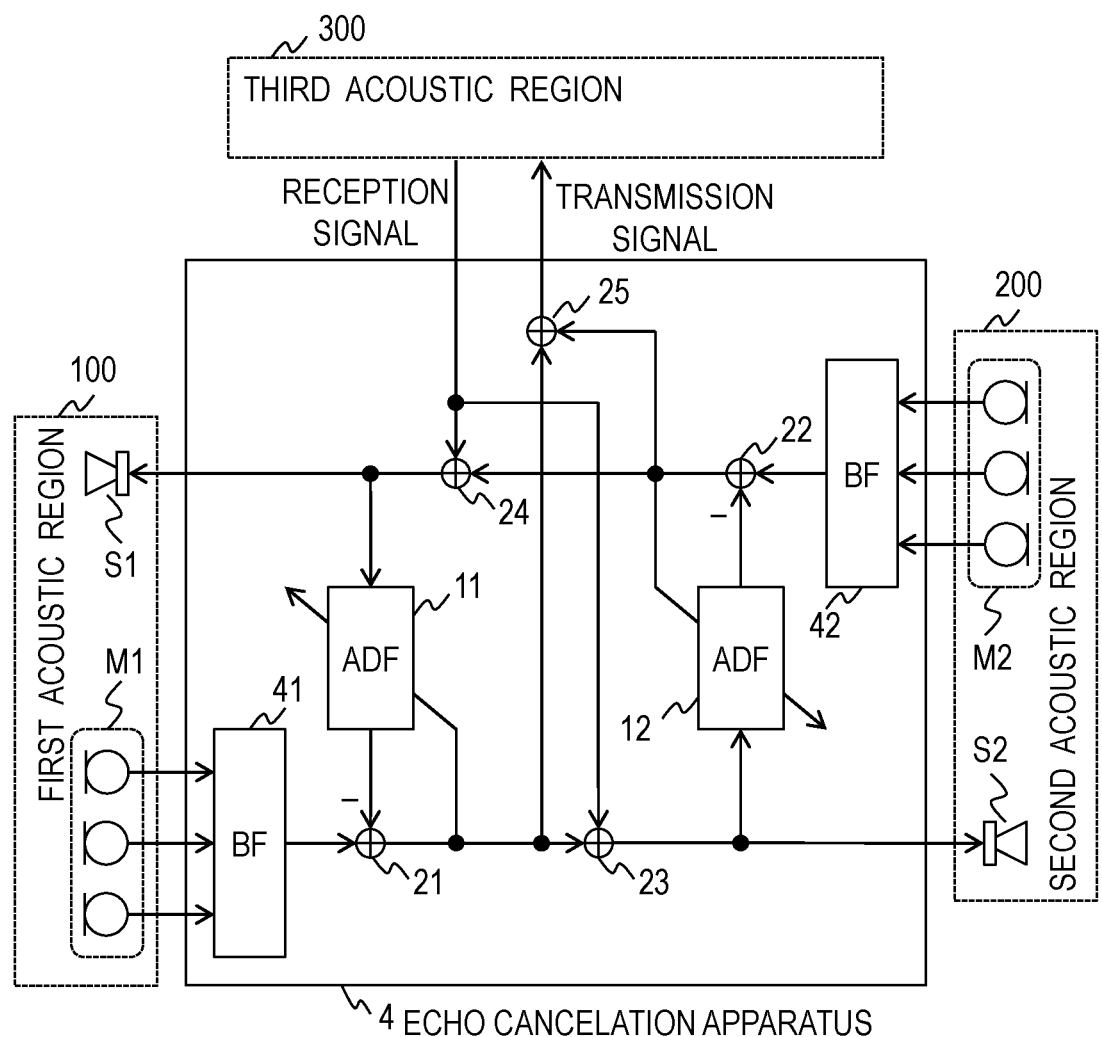
FIG. 9 is a diagram showing an example of the functional configuration of an echo cancelation apparatus according to a fourth embodiment.

In the fourth embodiment, microphones used for in-car communication are configured as a microphone array including a plurality of microphones. As shown in FIG. 9, in an echo cancelation apparatus 4 according to the fourth embodiment, beamformers (BFs) 41 and 42 for controlling the directivity are disposed in the subsequent stages of the respective microphone arrays, in addition to the two adaptive filters 11 and 12, the two subtractors 21 and 22, and the three adders 23 to 25 that are included in the echo cancelation apparatus 1 according to the first embodiment. The beamformer 41 for a microphone array M1 installed in the first acoustic region 100 is designed to collect the least possible sound emitted from the loudspeaker S2 installed in the second acoustic region 200. The beamformer 42 for a microphone array M2 installed in the second acoustic region 200 is designed to collect the least possible sound emitted from the loudspeaker S1 installed in the first acoustic region 100. Both of the designing of the beamformer 41 such that the microphone array M1 collects the least possible sound emitted from the loudspeaker S2, and the designing of the beamformer 42 such that the microphone array M2 collects the least possible sound emitted from the loudspeaker S1 may be performed, or only one of them may be performed.

The beamformers 41 and 42 obtain beamforming outputs by calculating a filter coefficient, for example, in the manner described below, multiplying the outputs of the microphones respectively constituting the microphone arrays M1 and M2 by the calculated filter coefficients, and obtaining a sum thereof. The transfer function from the loudspeaker S2 in the second acoustic region 200 to the microphone array M1 in the first acoustic region 100 is expressed as $H(\omega)$, the transfer function from the loudspeaker S1 in the first acoustic region 100 to the microphone array M1 in the first acoustic region 100 is expressed as $G(\omega)$, and the filter coefficient of the microphone array processing is expressed as $W(\omega)$. Note that $\omega$ is the frequency, and $H(\omega)$, $G(\omega)$, and $W(\omega)$ are vectors each including the number of elements corresponding to the number of microphones. The transfer function from the loudspeaker S2 in the second acoustic region 200 to the output of the microphone array M1 in the first acoustic region 100 can be calculated by $H(\omega)^H W(\omega)$. Here, $\cdot^H$ (the superscript "H") represents the conjugate transpose. Ideally, this transfer function may be 0. The transfer function from the loudspeaker S1 in the first acoustic region 100 to the output of the microphone array M1 in the first acoustic region 100 can be calculated by $G(\omega)^H W(\omega)$. Ideally, this transfer function is 1. That is, a filter $W(\omega)$ that satisfies the following simultaneous equations may be determined.

$$H(\omega)^H W(\omega) = 0$$
$$G(\omega)^H W(\omega) = 1$$

However, it is rare that a solution completely satisfying the simultaneous equations can be obtained. Therefore, the filter coefficient $W(\omega)$ is determined using the least square method or the like.

Thus, by using microphone arrays to perform beamforming so as to collect the least possible sound output from the loudspeakers, it is possible to more effectively prevent sound diffraction, and perform in-car communication with a louder sound.

While embodiments of the present invention have been described above, specific configurations are not limited to these embodiments. Needless to say, design modifications and the like within a range not departing from the spirit of the invention are encompassed in the scope of the present invention. The various types of processing described in the embodiments may be executed, not only in chronological order in accordance with order of the description, but also in parallel or separately depending on the processing ability of a device executing the processing or as necessary.

[Program and Recording Medium]

In the case where various processing functions in each of the apparatuses described in the above embodiments are realized by a computer, the processing details of the functions to be provided in the apparatuses are described by a program. Then, by executing the program on the computer, the various processing functions in the apparatuses are implemented on the computer.

The program describing the processing details can be recorded in a computer-readable recording medium. The computer-readable recording medium may be, for example, a magnetic recording device, an optical disk, a magneto-optical recording medium, a semiconductor memory, or the like.

The program is distributed, for example, by selling, assigning, or lending a portable recording medium such as a DVD or a CD-ROM in which the program is recorded. Furthermore, the program may be distributed by storing the program in a storage device of a server computer, and transferring the program from the server computer to other computers via a network.

The computer that executes such a program, for example, first temporarily stores, in its own storage device, the program recorded in the portable recording medium or the program transferred from the server computer. Then, at the time of executing processing, the computer reads the program stored in its own storage device, and executes the processing in accordance with the read program. As another mode of execution of the program, the computer may read the program directly from the portable recording medium, and execute the processing in accordance with the program. Furthermore, each time the program is transferred to the computer from the server computer, the computer may sequentially execute the processing in accordance with the received program. It is possible to adopt a configuration in which the program is not transferred to the computer from the server computer, and the above-described processing is executed by so-called application service provider (ASP) service by which the processing functions are implemented only by an instruction for execution thereof and result acquisition. Note that the program in the present mode includes information that is equivalent to a program and that is to be used for processing by an electronic computer (data that is not a direct instruction to the computer but has the property of defining the processing of the computer).

Although each of the present apparatuses is configured by executing a predetermined program on the computer in the present mode, at least some of these processing details may be implemented with hardware.

The invention claimed is:

1. An echo cancelation apparatus for use in a vehicle comprising:
   a first loudspeaker disposed in a first acoustic region in the vehicle;
   a first microphone disposed in the first acoustic region in the vehicle;
   a second loudspeaker disposed in a second acoustic region in the vehicle;
   a second microphone disposed in the second acoustic region in the vehicle;
   a first hands-free talking adaptive filter configured to generate a call signal component of a hands-free talking among acoustic echoes picked by the first microphone, by estimating a path from the first speaker to the first microphone and a path from the second speaker to the first microphone, using a call signal of the hands-free talking as a reference signal, the call signal of the hands-free talking being a reception signal from a third acoustic region set outside the vehicle;
   a first in-car communication adaptive filter configured to generate a reproduction signal component of an in-car communication among the acoustic echoes picked by the first microphone, by estimating the path from the first speaker to the first microphone, using a reproduction signal of the in-car communication as a reference signal, the reproduction signal of the in-car communication being output from the first speaker and being a communication between the first acoustic region and the second acoustic region;
   a second hands-free talking adaptive filter configured to generate a call signal component of the hands-free talking among acoustic echoes picked by the second microphone, by estimating a path from the second speaker to the second microphone and a path from the first speaker to the second microphone, using a call signal of the hands-free talking as a reference signal;
   a second in-car communication adaptive filter configured to generate a reproduction signal component of the in-car communication among the acoustic echoes picked by the second microphone, by estimating the path from the second speaker to the second microphone, using a reproduction signal of the in-car communication as a reference signal, the reproduction signal of the in-car communication being output from the second speaker; and
   a processing circuitry configured to:
      execute the first loudspeaker to emit an acoustic signal picked up by the second microphone;
      execute the second loudspeaker to emit an acoustic signal picked up by the first microphone;
      cancel, from the acoustic signal picked by the first microphone, the call signal component generated by the first hands-free talking adaptive filter and the reproduction signal component generated by the first in-car communication adaptive filter, and transmit the canceled acoustic signal picked by the first microphone to the third acoustic region; and
      cancel, from the acoustic signal picked by the second microphone, the call signal component generated by the second hands-free talking adaptive filter and the reproduction signal component generated by the second in-car communication adaptive filter, and transmit the canceled acoustic signal picked by the second microphone to the third acoustic region.

2. A non-transitory computer-readable recording medium on which an echo cancellation program for causing a computer to operate as the echo cancelation apparatus according to the claim 1 is recorded.

3. An echo cancelation method that is executed by an echo cancelation apparatus for use in a vehicle having a first loudspeaker and a first microphone disposed in a first acoustic region, and a second loudspeaker and a second microphone disposed in a second acoustic region, a first hands-free talking adaptive filter, a first in-car communication adaptive filter, a second hands-free talking adaptive filter, a second in-car communication adaptive filter and a processing circuitry, the echo cancelation method comprising:
   emitting, by the first loudspeaker, an acoustic signal picked up by the second microphone;
   emitting, by the second loudspeaker, an acoustic signal picked up by the first microphone;
   generating, by a first hands-free talking adaptive filter, a call signal component of a hands-free talking among acoustic echoes picked by the first microphone, by estimating a path from the first speaker to the first microphone and a path from the second speaker to the first microphone, using a call signal of the hands-free talking as a reference signal, the call signal of the hands-free talking being a reception signal from a third acoustic region set outside the vehicle;
   generating, by a first in-car communication adaptive filter, a reproduction signal component of an in-car communication among the acoustic echoes picked by the first microphone, by estimating a path from the first speaker to the first microphone, using a reproduction signal of the in-car communication as a reference signal, the reproduction signal of the in-car communication being output from the first speaker and being a communication between the first acoustic region and the second acoustic region;
   generating, by a second hands-free talking adaptive filter, a call signal component of a hands-free talking among acoustic echoes picked by the second microphone, by estimating a path from the second speaker to the second microphone and a path from the first speaker to the second microphone, using a call signal of the hands-free talking as a reference signal;

generating, by a second in-car communication adaptive filter, a reproduction signal component of an in-car communication among the acoustic echoes picked by the second microphone, by estimating the path from the second speaker to the second microphone, using a reproduction signal of the in-car communication as a reference signal, the reproduction signal of the in-car communication being output from the second speaker;

by the processing circuitry, canceling, from the acoustic signal picked by the first microphone, the call signal component generated by the first hands-free talking adaptive filter and the reproduction signal component generated by the first in-car communication adaptive filter, and transmitting the canceled acoustic signal picked by the first microphone to the third acoustic region; and by the processing circuitry, canceling, from the acoustic signal picked by the second microphone, the call signal component generated by the second hands-free talking adaptive filter and the reproduction signal component generated by the second in-car communication adaptive filter, and transmitting the canceled acoustic signal picked by the second microphone to the third acoustic region.

* * * * *